United States Patent
Oiwa et al.

(10) Patent No.: US 8,098,115 B2
(45) Date of Patent: Jan. 17, 2012

(54) NOISE ELIMINATING WIRE HARNESS

(75) Inventors: Kazuyuki Oiwa, Kosai (JP); Akira Baba, Kosai (JP)

(73) Assignee: Yazaki Corporation, Tokyo (JP)

(*) Notice: Subject to any disclaimer, the term of this patent is extended or adjusted under 35 U.S.C. 154(b) by 688 days.

(21) Appl. No.: 12/223,817

(22) PCT Filed: Feb. 9, 2007

(86) PCT No.: PCT/JP2007/052410
§ 371 (c)(1),
(2), (4) Date: Aug. 11, 2008

(87) PCT Pub. No.: WO2007/091689
PCT Pub. Date: Aug. 16, 2007

(65) Prior Publication Data
US 2009/0167461 A1    Jul. 2, 2009

(30) Foreign Application Priority Data
Feb. 10, 2006  (JP) .................. 2006-033872

(51) Int. Cl.
*H04B 3/28*   (2006.01)
*H03H 7/00*   (2006.01)

(52) U.S. Cl. .................. 333/181; 333/12

(58) Field of Classification Search ............ 333/12, 333/167, 181, 204, 205; 343/711–713, 722; 361/301.2, 306.2; 307/9.1, 10.1, 89; 174/32
See application file for complete search history.

(56) References Cited

U.S. PATENT DOCUMENTS

| 2,270,169 A | * | 1/1942 | Muller .................... 361/306.2 |
| 6,064,345 A | * | 5/2000 | Ohnishi et al. ............ 343/713 |

FOREIGN PATENT DOCUMENTS

| CN | 2299414 Y | 12/1998 |
| CN | 1254167 A | 5/2000 |
| JP | 58-167244 A | 10/1983 |
| JP | 64-089107 A | 4/1989 |
| JP | 07-039058 A | 2/1995 |
| JP | 09-045385 A | 2/1997 |
| JP | 2001-357910 A | 12/2001 |
| JP | 2005-354767 A | 12/2005 |
| JP | 2006-107809 A | 4/2006 |
| JP | 2006-173414 A | 6/2006 |

OTHER PUBLICATIONS

First Office Action issued Jun. 2, 2010 in counterpart Chinese Application No. 200780004551.3.

* cited by examiner

*Primary Examiner* — Robert Pascal
*Assistant Examiner* — Kimberly Glenn
(74) *Attorney, Agent, or Firm* — Sughrue Mion, PLLC

(57) ABSTRACT

There is provided a noise eliminating wire harness capable of enhancing a noise elimination performance. In the wire harness 31, an intermediate portion of a sheath 34 of a wire 33 is removed to expose a conductor 35, thereby forming a conductor connection portion 36, and a capacitor 39 is directly connected to this conductor connection portion 36. The capacitor 39 is directly connected to the conductor connection portion 36 without using any wire serving as a branch wire. The capacitor 39 is connected to the conductor connection portion 36 in perpendicularly intersecting relation thereto. The capacitor 39 is connected to the wire 33 in such a condition that there is not provided any portion extending side by side with the wire 33.

7 Claims, 6 Drawing Sheets

NOISE ELIMINATING WIRE HARNESS

TECHNICAL FIELD

This invention relates to a wire harness, and more specifically to a noise eliminating wire harness which has a wire connected to a power source and a load and is connected to the ground by the use of a capacitor for noise elimination purposes.

BACKGROUND ART

A capacitor 1 for preventing radio noise in an automobile and a connection circuit 2 for this capacitor 1 are shown in FIG. 5. In this FIG. 5, the capacitor 1 is connected to a defogger circuit 3 serving also as an antenna wire of the automobile. Further, the capacitor 1 is connected to a panel portion of the automobile for body grounding purposes. The above structure is disclosed in Patent Literature 1 mentioned below. A specific connection structure for connecting the capacitor 1 to the defogger circuit 3 is also disclosed in the following Patent Literature 1. The above structure will be described with reference to FIGS. 5 to 7.

In FIG. 6, the capacitor 1 is housed in an insulating case 4. The capacitor 1 is connected at its one terminal 5 to an intermediate portion of a junction terminal 6. The other terminal 7 thereof is connected to a grounding terminal 8. The junction terminal 6 is formed by bending a strip-like conductor into a U-shape. Two portions of the junction terminal 6 projecting from the insulating case 4 serve as connection portions 9, 10, respectively. The grounding terminal 8 is connected at its one end 11 to the capacitor 1. The other end 12 of the grounding terminal 8 is disposed and formed to project in a direction away from the connection portions 9, 10 of the junction terminal 6. A screw hole 14 for fixing by the use of a bolt 13 is formed through the other end 12 of the grounding terminal 8. The capacitor 1 is adapted to be connected to the ground (the body) via the grounding terminal 8.

In FIG. 7, reference numeral 15 denotes a connector for connecting the capacitor 1. This connector 15 is provided at terminals of capacitor connection circuits 17, 18 formed by cutting an intermediate portion of a wire 16 (wire harness) connected to the defogger circuit 3 of FIG. 5. The connector 15 comprises an insulating housing 19, and female terminals 20, 21 housed in this insulating housing 19. The female terminals 20, 21 are electrically connected to terminals of the capacitor connection circuits 17, 18, respectively. The length of the capacitor connection circuits 17, 18 is determined in accordance with the distance between a path of installation of the wire 16 and a fixed position of the grounding terminal 8 connected to the capacitor 1. Taking a space into consideration, the capacitor connection circuits 17, 18 are installed to extend in side by side relation.

Incidentally, because of the existence of the capacitor connection circuits 17, 18, known harness fixing members 22, 22 such as clamps are provided respectively at illustrated positions of the wire 16. The harness fixing members 22 are provided at the respective positions so as to install the wire harness along a predetermined path.

Patent Literature 1: JP-A-9-45385 Publication (Page 2, FIGS. 4 to 6)

DISCLOSURE OF THE INVENTION

Problem that the Invention is to Solve

The above conventional technique has the structure in which the capacitor connection circuits 17, 18 exist in a manner to extend away from the path of installation of the wire 16, and also these capacitor connection circuits 17, 18 extend in side by side relation, and therefore it has a problem that even when trying to absorb noise by the capacitor 1, there is a fear that the noise is propagated to the downstream side by induction. In other words, the above conventional technique has a problem that elimination of noise components is incomplete. Therefore, it is thought that it is necessary to reconsider the whole of the wire harness.

The present invention has been made in view of the above circumstances, and a problem is to provide a noise eliminating wire harness in which a noise elimination performance can be enhanced.

Means for Solving the Problem

In order to solve the above problem, a noise eliminating wire harness of the present invention comprises a wire that is connected to a power source and a load, and a capacitor for eliminating noise that is connected to the ground, and a conductor connection portion is provided at an intermediate portion of the wire, and the capacitor is directly connected to the conductor connection portion.

In the present invention having these features, when regarding the wire connected to the load as a main wire, wires installed to extend from this main wire to the capacitor, that is, capacitor connection circuits forming branch wires, become unnecessary. At the upstream and downstream sides of the capacitor connecting portion, the main wire does not have any portion with which such branch wires extend side by side, and therefore the propagation of noise by induction is positively reduced. Also, attenuation characteristics are markedly enhanced (The attenuation characteristics will be described in Section "Best Mode for Carrying Out the Invention").

Preferably, the noise eliminating wire harness of the present invention further comprises a connection terminal, and the capacitor is directly connected to the conductor connection portion through the connection terminal.

In the present invention having this feature, with respect to the direct connection, besides an arrangement in which a terminal which the capacitor itself has is directly connected to the conductor connection portion by soldering, thermal welding or other means, the direct connection by the use of an exclusive connection terminal is included. With the use of the connection terminal, the connection to the main wire can be effected without using any branch wire as is the case with the direct connection of the terminal which the capacitor itself has. The connection terminal is connected to the conductor connection portion by press-clamping, press-contact, soldering, thermal welding or other means.

Preferably, the direction of direct connection of the capacitor to the conductor connection portion is substantially perpendicular to the direction of extending of the wire.

In the present invention having this feature, there is provided the structure in which any portion extending as a wire side by side with the main wire, that is, any branch wire, does not exist, and besides the terminal or the connection terminal directly connected to the conductor connection portion does not extend side by side with the main wire.

Preferably, a car radio antenna is provided in the vicinity of the load.

In the present invention having this feature, a peak of the noise elimination performance is caused to fall within an AM radio frequency band (This will be described in Section "Best Mode for Carrying Out the Invention".) by the structure of the present invention and the capacity of the capacitor used here. This is effective when the car radio antenna exists in the vicinity of the load (load which can generate noise) to which the noise eliminating wire harness of the present invention is connected.

Preferably, the position where the capacitor is directly connected to the conductor connection portion is disposed in the vicinity of the load.

In the present invention having this feature, the noise elimination performance is further enhanced.

Advantage of the Invention

In the present invention, there is provided the structure in which the capacitor is directly connected to the main wire without using any branch wire. Therefore, with this structure, there is achieved an advantage that the noise elimination performance can be enhanced. In the present invention, there is also achieved an advantage that any portion extending side by side with the main wire can be eliminated even at a terminal level. Furthermore, in the present invention, there is achieved an advantage that the structure is effective when the car radio antenna exists in the vicinity of the load which can generate noise. Furthermore, in the present invention, there is achieved an advantage that the noise elimination performance can be further enhanced.

BRIEF DESCRIPTION OF THE DRAWINGS

FIG. 1A is an explanatory view showing an installed condition of the noise eliminating wire harness, and FIG. 1B is constructional view of an important portion of the noise eliminating wire harness.

FIG. 2A is a graph comparing attenuation amounts, and FIG. 2B is a schematic view of the noise eliminating wire harness of the present invention, and FIG. 2C is a schematic view of a comparative wire harness.

Figure 1A:
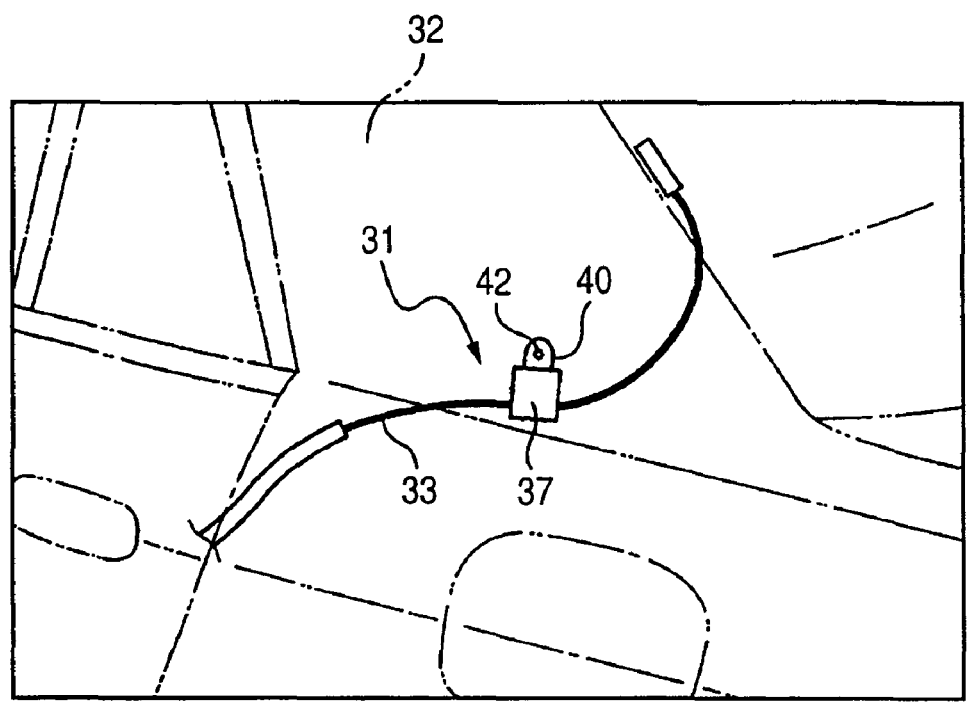
FIGS. 1A and 1B are schematic views showing one embodiment of a noise eliminating wire harness of the present invention.

DESCRIPTION OF THE REFERENCE NUMERALS 31 noise eliminating wire harness (wire harness)
32 automobile
33 wire
34 sheath
35 conductor
36 conductor connection portion
37 noise elimination element part
38 connection terminal portion
39 capacitor
40 grounding terminal portion
41 insulating case
42 screw hole

BEST MODE FOR CARRYING OUT THE INVENTION

Figure 1B:
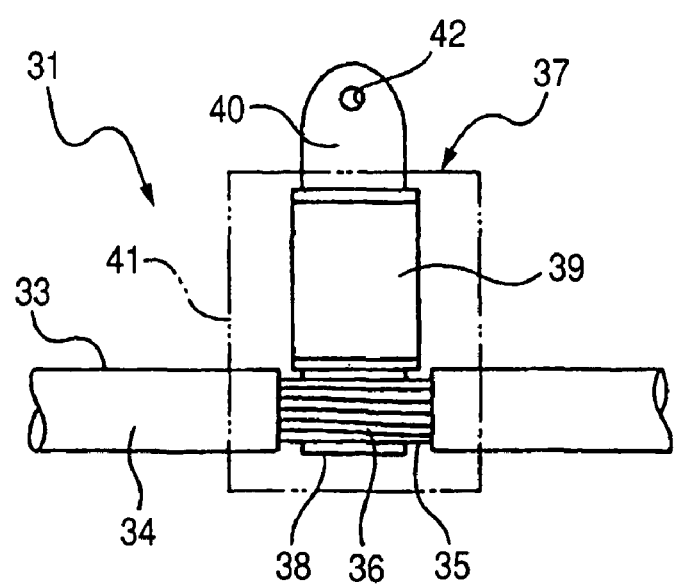
Figure 2A:
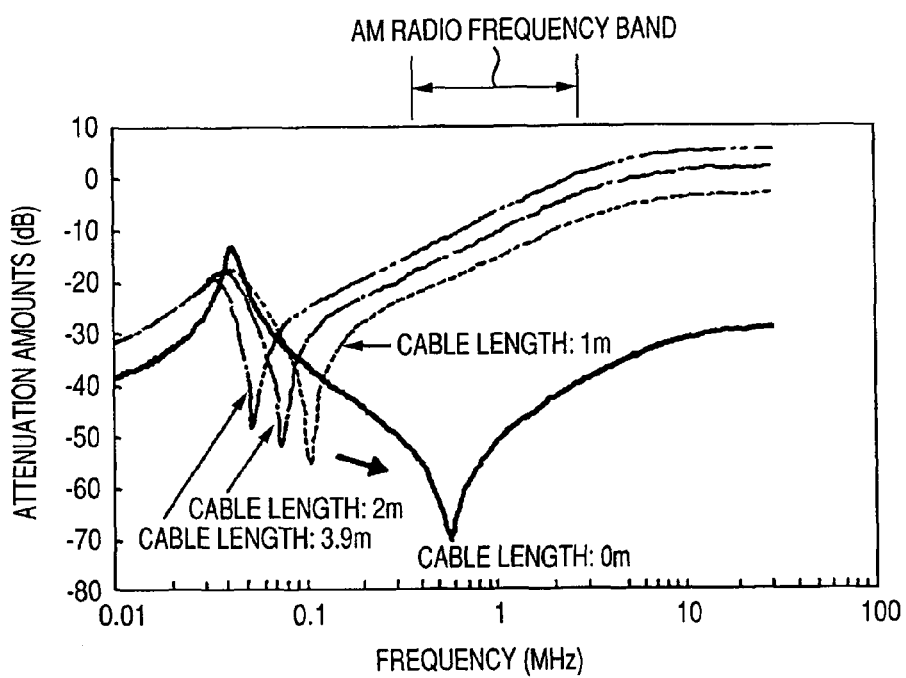
FIGS. 2A to 2C are explanatory diagrams with respect to a nose elimination performance of the noise eliminating wire harness of the present invention.
Figure 2B:
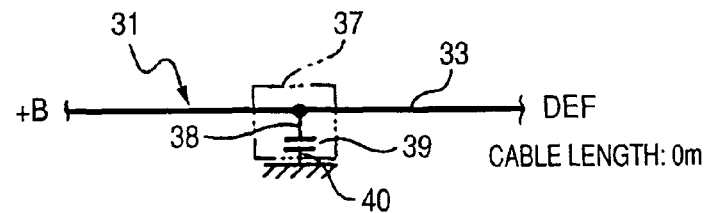
Figure 2C:
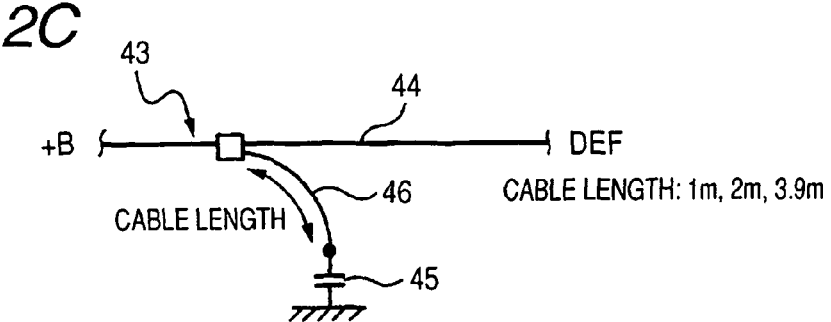

Description will now be made with reference to the drawings. FIGS. 1A and 1B are schematic views showing one embodiment of a noise eliminating wire harness of the present invention. More specifically, FIG. 1A is an explanatory view showing an installed condition of the noise eliminating wire harness, and FIG. 1B is a constructional view of an important portion of the noise eliminating wire harness. FIGS. 2A to 2C are explanatory diagrams with respect to a nose elimination performance of the noise eliminating wire harness of the present invention. More specifically, FIG. 2A is a graph comparing attenuation amounts, FIG. 2B is a schematic view of the noise eliminating wire harness of the present invention, and FIG. 2C is a schematic view of a comparative wire harness.

In FIGS. 1A and 1B, reference numeral 31 denotes the noise eliminating wire harness (hereinafter abbreviated as wire harness 31) of the present invention. In the Figure, only a rear-side portion of an automobile 32 is shown. The wire harness 31, although not particularly limited to this purpose, is provided for supplying electric power to a defogger circuit which is a load (a load which can generate noise), and is installed along a predetermined path. In this embodiment, an AM radio antenna is provided in the vicinity of a defogger circuit.

The wire harness 31 has a noise elimination function, and is installed at a region where noise elimination is required. Specifically describing the wire harness 31, this wire harness 31 is constructed such that a sheath 34 of a wire 33 is removed at an intermediate portion thereof to expose a conductor 35, thereby forming a conductor connection portion 36, and a connection terminal portion 38 of a noise elimination element part 37 is connected to the thus formed conductor connection portion 36.

The noise elimination element part 37 includes a capacitor 39, the connection terminal portion 38, a grounding terminal portion 40, and an insulating case 41. Both of the connection terminal portion 38 and the grounding terminal portion 40 have electrical conductivity, and are provided as terminals of the capacitor 39 (In the case where an exclusive connection terminal is used, this will be described later). The connection terminal portion 38 is connected to the conductor 35 of the conductor connection portion 36 by press-clamping connection, press-contact connection, soldering, thermal welding or other means (In the case of the press-contact connection, there is used a method in which the press-contact is directly applied to the sheath without removing an intermediate portion of the sheath 34).

The capacitor 39 is adapted to be directly connected to the conductor connection portion 36 without using any wire serving as a branch wire. The capacitor 39 is connected to the conduction connection portion 36 in a direction perpendicular thereto. The capacitor 39 is connected to the wire 33 in such a condition that there is not provided any portion extending side by side with the wire 33.

The grounding terminal portion 40 is provided as a body-grounding portion. A screw hole 42 serving as a fixing portion is formed through the grounding terminal portion 40. The grounding terminal portion 40 functions as a harness fixing member. The insulating case 41 is in the form of a box body made of a synthetic resin having an insulating property, and is provided as a portion for insulating and protecting purposes.

Figure 5:
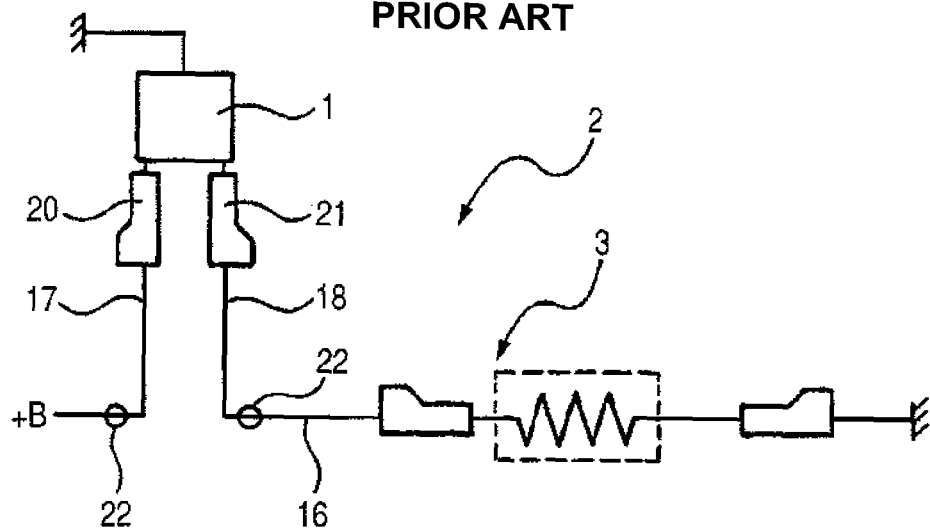
FIG. 5 shows a conventional example, and is a circuit diagram showing a connection circuit through which a capacitor is connected to a defogger circuit.
Figure 6:
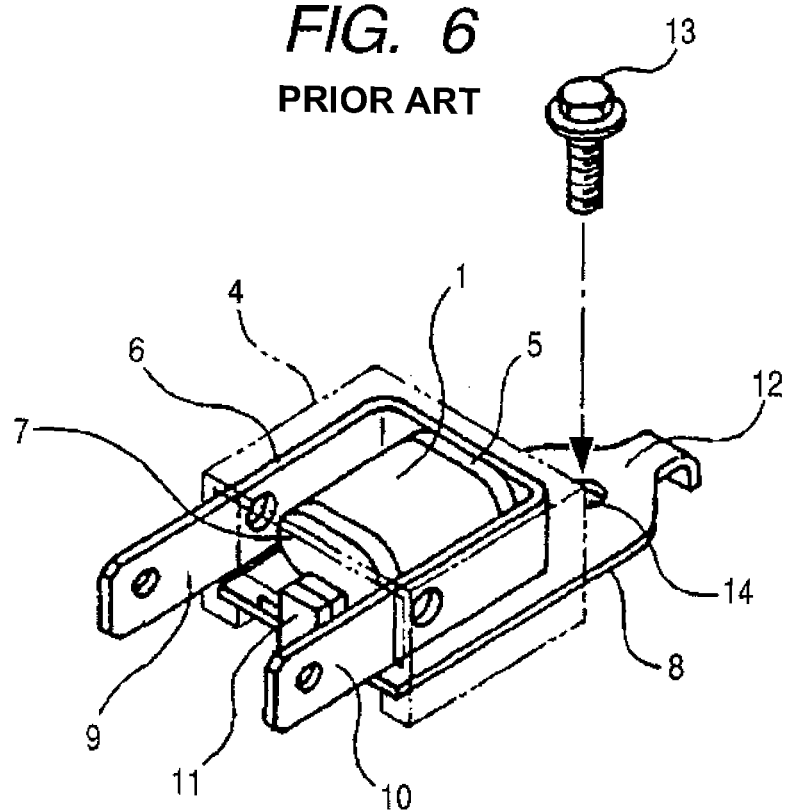
FIG. 6 is a perspective view showing the capacitor of FIG. 5 and its surrounding structure.
Figure 7:
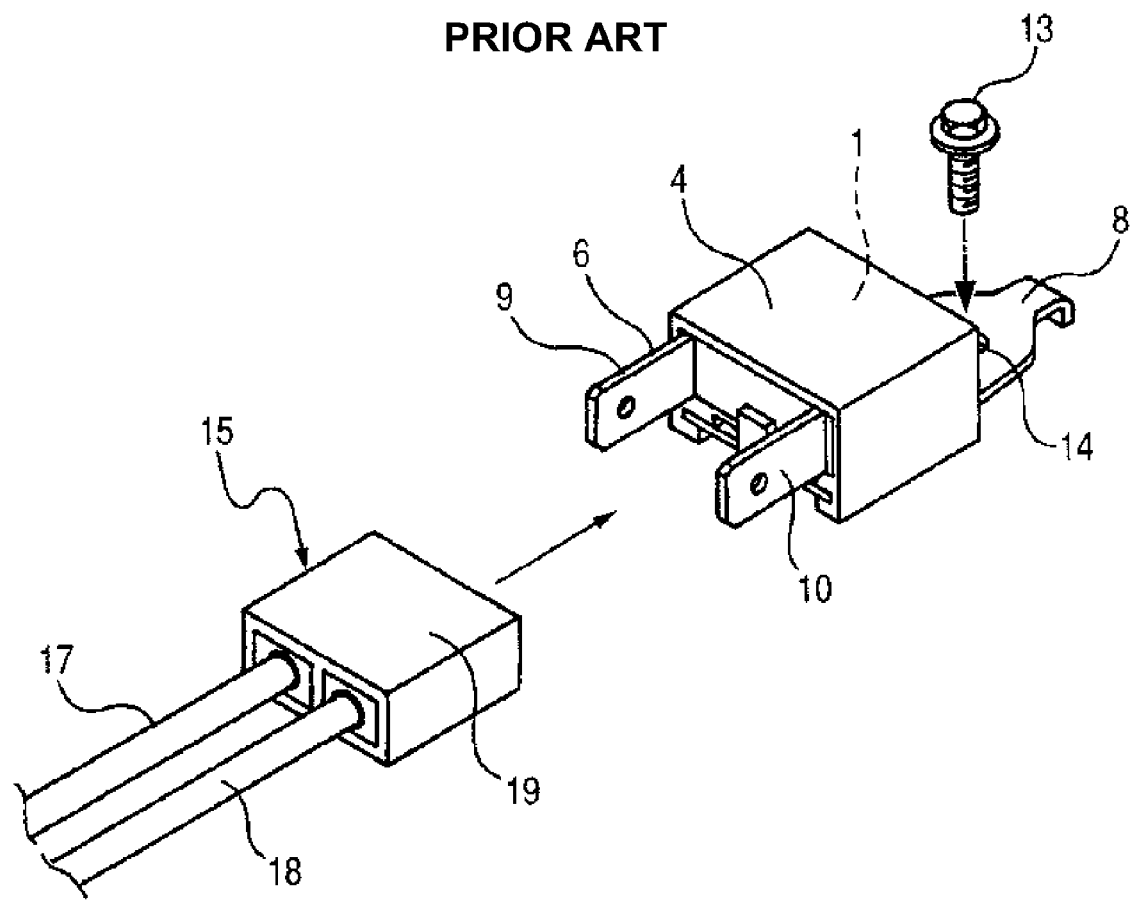
FIG. 7 is a perspective view showing the connection of a connector.

As described above, the wire harness 31 is constructed such that the capacitor 39 is directly connected to the conductor connection portion 36 of the wire 33 via the connection terminal portion 38. Namely, the wire harness has such a structure that the provision of the capacitor connection circuits 17, 18 (see FIGS. 5 and 7) as in the conventional example are omitted, thus eliminating the side-by-side extending of these circuits. Therefore, there is achieved an advantage that the propagation of noise by induction can be positively reduced as compared with the conventional example.

Figure 3:
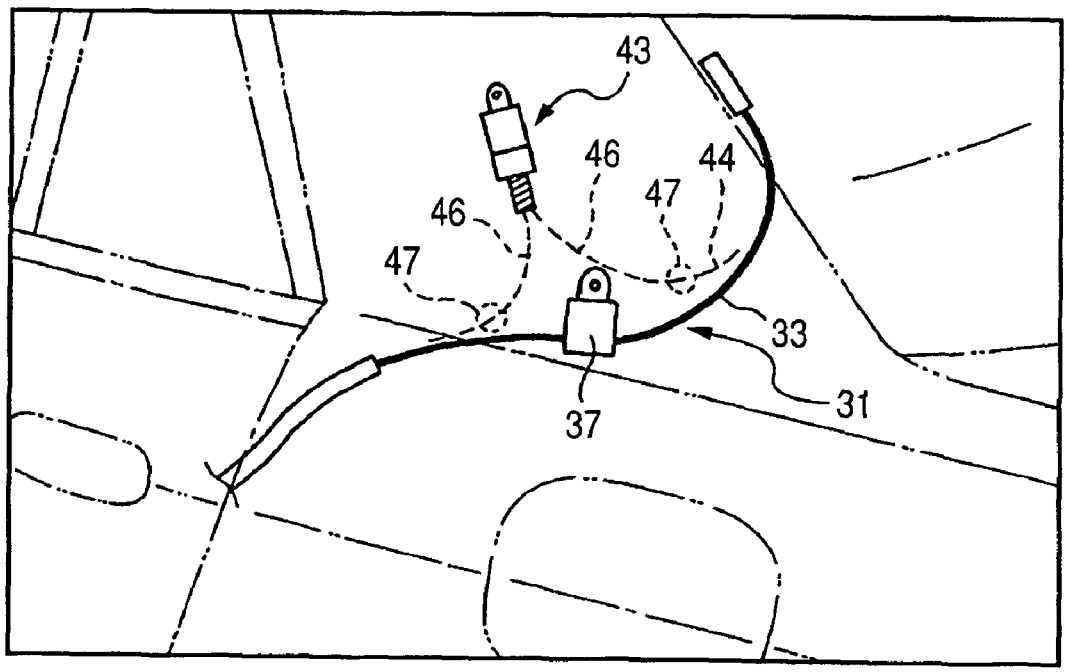
FIG. 3 is an explanatory view showing installed conditions of the wire harnesses of FIGS. 2B and 2C.

Next, the noise elimination performance of the noise eliminating wire harness of the present invention will be described with reference to FIGS. 2A to 2C and FIG. 3. FIGS. 2A to 2C are the explanatory diagrams with respect to the nose elimination performance, and FIG. 2A is the graph comparing the attenuation amounts, and FIG. 2B is the schematic view of the noise eliminating wire harness of the present invention, and FIG. 2C is the schematic view of the comparative wire harness. FIG. 3 is an explanatory view showing installed conditions of the wire harnesses of FIGS. 2B and 2C.

In FIGS. 2A to 2C, the wire harness 31 of the present invention is constructed such that the noise elimination element part 37 (the capacitor 39) is directly connected to the wire 33 as described above (With respect to the installed condition, see FIG. 3). On the other hand, the comparative wire harness 43 is constructed such that capacitor connection circuits 46 are interposed between a wire 44 and a capacitor 45 (With respect to the installed condition, see FIG. 3. Reference numeral 47 denotes a harness fixing member). There are prepared three kinds of comparative wire harnesses 43 in which cable lengths of their respective capacitor connection circuits 46 are 1 m, 2 m and 3.9 m, respectively. In the wire harness 31 of the present invention, a cable length is naturally 0 m.

With respect to attenuation amounts of the wire harness 31 of the present invention and the three kinds of comparative wire harnesses 43 for an input of 120 dBuV, results are shown in FIG. 2A. It will be appreciated from FIG. 2A that the shorter the cable length becomes, the better the attenuation characteristics become. Also, it will be appreciated that frequency characteristics shift. The wire harness 31 of the present invention can achieve an advantage that the noise elimination performance can be enhanced.

It will be appreciated from the results of FIG. 2A that a peak of the noise elimination performance of the wire harness 31 of the present invention falls within the AM radio frequency band. And besides, the wire harness 31 of the present invention is installed to the defogger circuit provided as a load forming a noise generation factor, and therefore there is also achieved an advantage that the noise elimination effect can be enhanced.

With respect to other advantages, there can be enumerated several advantages that the ideal installation can be achieved, that the need for external members such as harness fixing members can be obviated, that a wasteful space can be eliminated and that the man hour for a connector fitting operation can be saved.

Figure 4:
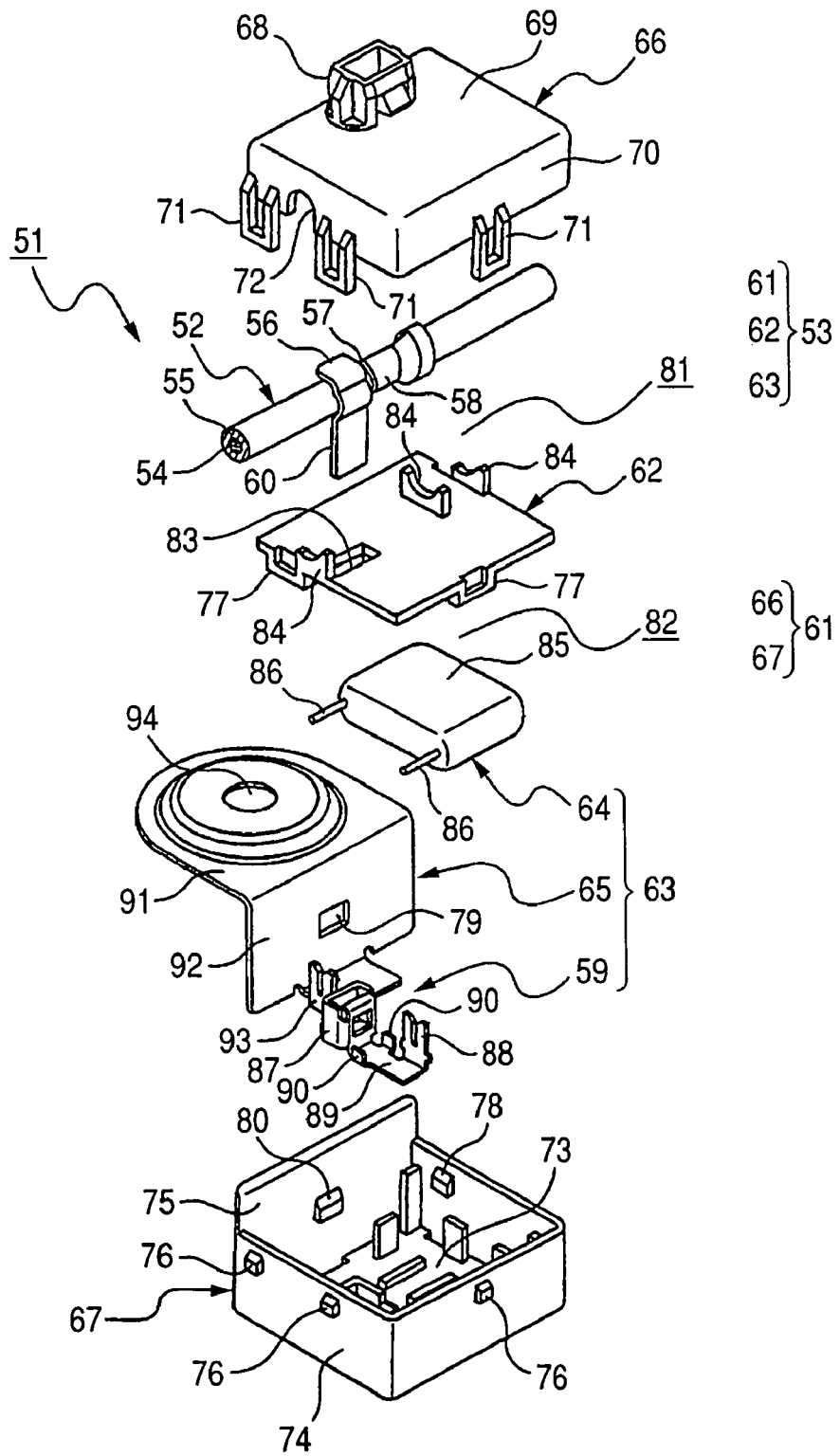
FIG. 4 is an exploded perspective view showing one embodiment of a noise eliminating wire harness of the present invention.

Next, another embodiment of a noise eliminating wire harness of the present invention will be described with reference to FIG. 4. FIG. 4 is an exploded perspective view showing another embodiment. FIG. 4 covers the description for the use of "exclusive connection terminal" referred to in the description for FIGS. 1A and 1B.

In FIG. 4, the noise eliminating wire harness 51 (hereinafter abbreviated as wire harness 51) comprises a wire 52, and a noise elimination element part 53 connected to this wire 52.

The wire harness 51 is installed at a position similar to the position of the above-mentioned wire harness 31.

The wire 52 is one of a plurality of wires forming the wire harness 51 or a single wire, and comprises a conductor 54, and an insulating sheath 55 covering this conductor 54. A first connection terminal 56 is electrically connected to an intermediate portion of the wire 52. More specifically, the first connection terminal 56 is connected to that portion of the conductor 54 which is made bare by removing (stripping) the sheath 55 over a predetermined range at the intermediate portion of the wire 52. The bared portion of the conductor 54 is formed as a conductor connection portion 57.

The first connection terminal 56 includes a press-clamping portion 58 for direct connection to the conductor 54, and a tab portion 60 for connection to a second connection terminal 59 (described later) of the noise elimination element part 53. The press-clamping portion 58 includes a portion for contact with the conductor 54, and a portion for press-fastening the sheath 55 although these portions are not particularly designated by reference numerals. The tab portion 60 is disposed and formed so as to extend in a direction perpendicular to a direction of extending of the wire 52. Namely, the tab portion 60 is connected to the conductor connection portion 57 in perpendicular relation thereto. The tab portion 60 need only to be connected to the second connection terminal 59 described later, and its length is made as short as possible.

The noise elimination element part 53 comprises an upper-lower resin cover 61, an inner resin cover 62, and a circuit 63. The circuit 63 comprises a capacitor 64, the second connection terminal 59, and a grounding terminal 65. The upper-lower resin cover 61 comprises an upper resin cover 66 and a lower resin cover 67 which are molded of an insulative synthetic resin material. The upper resin cover 66 and the lower resin cover 67 are formed such that these resin covers, when fitted to each other, form a box-like member. The upper resin cover 61 has a clamp 68 which retains and fixes the assembled noise eliminating element part 53 to a vehicle body. The upper resin cover 66 and the lower resin cover 67 are not limited to a separate structure, but may be formed into such a structure that the two are made continuous with each other by a hinge.

The upper resin cover 66 includes a ceiling wall 69, and four peripheral side walls 70 of the same height. A depth of the upper resin cover 66 from its open portion is smaller than that of the lower resin cover 67. The clamp 68 is formed integrally on an outer surface of the ceiling wall 69. A plurality of retaining portions 71 and two wire lead-out portions 72 (only one of which is shown) are formed at outer surfaces of the peripheral side walls 70. The retaining portion 71 is formed into a U-shape, and has flexibility so as to be opened outwardly. These retaining portions 71 are disposed and formed at three of the four peripheral side walls 70. The wire lead-out portions 72 are formed respectively in the pair of peripheral side walls 70 perpendicularly intersecting the direction of extending of the wire 52. The wire lead-out portion 72 is formed into a U-shaped notch groove-shape corresponding to a diameter of the wire 52.

The lower resin cover 67 includes a bottom wall 73, three peripheral side walls 74 having the same height, and one peripheral side wall 75 slightly higher than the other peripheral side walls. A plurality of projections and a plurality of ribs are formed on an inner surface of the bottom wall 73 although these are not particularly designated by reference numerals. The plurality of projections and the plurality of ribs are so disposed and formed that each of constructions of a circuit 63 can be attached with one touch, that each construction can be retained and that each construction can be insulated.

A plurality of retaining projections 76 with which the retaining portions 71 of the upper resin cover 66 are engaged, respectively, for retaining purposes are formed on outer surfaces of the three peripheral side walls 74 of the same height. Also, a plurality of retaining projections 78 with which retaining portions 77 (described later) of the inner resin cover 62 are engaged, respectively, for retaining purposes, are formed on inner surfaces of the three peripheral side walls 74 of the same height. A retaining projection 80 with which a retaining portion 79 (described later) of the grounding terminal 65 is engaged for retaining purposes is formed on an inner surface of the slightly-higher peripheral side wall 75.

The upper resin cover 66 and the lower resin cover 67 have the above fitting structure, and therefore are so formed as to be combined together with one touch. Also, the lower resin cover 67 and the inner resin cover 62 are so formed as to be combined together with one touch. Further, as described above, each of the constructions of the circuit 63 is so formed as to be attached with one touch. Therefore, there is provided the noise eliminating element part 53 of good productivity.

The inner resin cover 62 is a member molded of an insulative synthetic resin material, and is so formed as to divide an internal space of the upper-lower resin cover 61, formed by fitting the upper resin cover 66 and the lower resin cover 67 to each other, into a wire receiving space 81 and an element receiving space 82. Namely, the inner resin cover 62 is formed into a generally plate-shape so as to separate the intermediate portion of the wire 52 from the circuit 63. A terminal insertion hole 83 is formed through this inner resin cover 62. The terminal insertion hole 83 is so formed as to enable the first connection terminal 56 to be inserted from the wire receiving space 81 into the element receiving space 82. The terminal insertion hole 83 is formed so as to be disposed in registry with the second connection terminal 59 described later.

A plurality of wire receiving portions 84 are formed on that side of the inner resin cover 62 facing the wire receiving space 81. The plurality of wire receiving portions 84 are arranged in line with the terminal insertion hole 83. The wire receiving portion 84 is a rib-like projection, and its projecting distal end is formed into an arc-shaped recess corresponding to the diameter of the wire 52. The wire receiving portions 84 are formed as portions for positioning the intermediate portion of the wire 52. Incidentally, in case portions similar to the wire receiving portions 84 or portions for pressing the intermediate portion of the wire 52 are formed on an inner surface of the ceiling wall 69 of the upper resin cover 66, the intermediate portion of the wire 52 received within the wire receiving space 81 can be held.

An element holding portion (its showing is omitted) is formed on that side of the inner resin cover 62 facing the element receiving space 82. This element holding portion is so formed as to abut against a capacitor 64 of the circuit 63 received within the element receiving space 82 to hold this capacitor 64. A merely flat surface, ribs or others are given as one example of the element holding portion.

The plurality of retaining portions 77 for engagement respectively with the retaining projections 78 on the inner surface of the lower resin cover 67 are formed on three of four side edges (edge portions) of the inner resin cover 62 forming the peripheral edge portion thereof. The retaining portion 77 is formed into a U-shape, and has flexibility so as to be bent inwardly. That side edge of the inner resin cover 62 where no retaining portion 77 exists at the peripheral edge portion thereof is so formed as to be opposed to the slightly-higher peripheral side wall 75 of the lower resin cover 67 with a predetermined gap formed therebetween. The predetermined gap is provided so as to grip part of the grounding terminal 65.

The capacitor 64 includes an element body 85 of a generally square floor cushion-shape as shown in the drawings, and a pair of connection legs (terminals) 86. The capacitor 64 is adapted to be held in such a condition that it will not be shaken by vibration of the vehicle and others.

The second connection terminal 59 is an exclusive connection terminal serving as a junction making the electrical connection between the first connection terminal 56 and the capacitor 64, and includes a female terminal-shaped tab connection portion 87 into which the tab portion 60 of the first connection terminal 56 is inserted, and a female receiving tab-like element connection portion 88 into which one connection leg 86 of the capacitor 64 is inserted. The tab connection portion 87 and the element connection portion 88 are integrally formed upright at opposite end portions of a bus bar-like base plate portion 89, respectively. Reference numeral 90 denotes terminal holding portions for preventing the disengagement from the fitting structure comprising the above-mentioned projections and ribs formed on the bottom wall 73 of the lower resin cover 67. The terminal holding portions 90 are relatively-small piece-like projections, and are integrally formed upright at an intermediate portion of the base plate portion 89.

The second connection terminal 59 is disposed to extend in a direction perpendicular to the direction of extending of the wire 52. Also, the second connection terminal 59 is disposed perpendicularly to the tab portion 60.

The grounding terminal 65 is a terminal for electrical connection to the vehicle body, and includes a grounding portion 91 for connection to the vehicle body, a cover inner surface intimately-contacting portion 92 for intimate contact with the inner surface of the slightly-higher peripheral side wall 75 of the lower resin cover 67, and a female receiving tab-like element connection portion 93 into which the other connection leg 86 of the capacitor 64 is inserted. The grounding portion 91 is formed into such a shape as to be held in surface-contact with the vehicle body, and has a through hole-like screw hole 94 formed through its central portion for screw fastening purposes.

The cover inner surface intimately-contacting portion 92 has a flat plate-like shape, and is disposed and formed to be continuous with the grounding portion 91 and the element connection portion 93. Also, the cover inner surface intimately-contacting portion 92 is disposed and formed in such a direction that it is perpendicular to the grounding portion 91 and also to the element connection portion 93. The retaining portion 79 for engagement with the retaining projection 80 on the slightly-higher peripheral side wall 75 is formed through a central portion of this cover inner surface intimately-contacting portion 92.

The element connection portion 93 of the grounding terminal 65 is disposed and formed so as to correspond to the position of the connection leg 86 of the capacitor 64 as is the case with the element connection portion 88 of the second connection terminal 59. The element connection portion 93 of the grounding terminal 65 and the element connection portion 88 of the second connection terminal 59 are arranged in a juxtaposed manner with the tab connection portion 87 of the second connection terminal 59 interposed therebetween.

Next, the mounting of the first connection terminal 56 as well as and the mounting of the noise elimination element part 53 will be described on the basis of the above construction.

With respect to the first connection terminal 56 at the conductor connection portion 57 of the wire 52, first, the sheath 55 is removed over the predetermined range at the intermediate portion of the wire 52 to expose the conductor 54, thereby forming the conductor connection portion 57.

Then, the press-clamping portion 58 is press-clamped to the conductor connection portion 57 to be connected thereto. As a result, the mounting of the first connection terminal 56 is completed.

With respect to the noise elimination element part 53, first, the second connection terminal 59 and the grounding terminal 65 are fixed in predetermined positions to the lower resin cover 67 by fitting. Then, the capacitor 64 is connected to the fixed second connection terminal 59 and grounding terminal 65 to form the circuit 63. Then, the inner resin cover 62 is fitted to the lower resin cover 67 in such a condition that it covers the circuit 63 and that the capacitor 64 is held by the element holding portion (its showing is omitted). Then, the intermediate portion of the wire 52 is placed on the wire receiving portions 84 of the inner resin cover 62, and also the tab portion 60 of the first connection terminal 56 is inserted into the terminal insertion hole 83 in the inner resin cover 62, thereby connecting the first connection terminal 56 to the circuit 63. Finally, the upper resin cover 66 is fitted to the lower resin cover 67 in such a manner that the intermediate portion of the wire 52 is covered with the upper resin cover 66. As a result, the mounting of the noise elimination element part 53 is completed.

After the mounting operations are thus effected, the noise elimination element part 53 is retained and fixed to the vehicle body through the clamp 68, and also the grounding terminal 65 is connected to the body for grounding purposes by screw-fastening, thus completing the series of operations. Namely, the wire harness 51 is installed along a predetermined path.

As described above with reference to FIG. 4, the wire harness 51 is constructed such that the capacitor 64 is directly connected to the wire 52 in such a condition that there is not provided any portion extending side by side with the wire 52, and the capacitor is connected to the ground. In the wire harness 51, there is no wire interposed between the wire 52 and the capacitor 64, and therefore its cable length is 0 m, and the results as shown in FIG. 2A can naturally be obtained. Therefore, the wire harness 51 achieves an advantage that the noise elimination performance can be enhanced.

Furthermore, various changes can, of course, be effected without changing the subject matter of the present invention.

The present invention is based on Japanese Patent Application (Patent Application No. 2006-033872) filed on Feb. 10, 2006, and contents thereof are incorporated herein as a reference.

The invention claimed is:

1. A noise eliminating wire harness, comprising:
   a wire that is connected to a power source and a load; and
   a capacitor for eliminating noise that is connected to ground,
   wherein a conductor connection portion is provided at an intermediate portion of the wire; and
   wherein the capacitor is directly connected to the conductor connection portion;
   wherein a direction of direct connection of the capacitor to the conductor connection portion is substantially perpendicular to a direction of extending of the wire.

2. The noise eliminating wire harness according to claim 1, further comprising:
   a connection terminal,
   wherein the capacitor is directly connected to the conductor connection portion through the connection terminal.

3. The noise eliminating wire harness according to claim 1, wherein a car radio antenna is provided in the vicinity of the load.

4. The noise eliminating wire harness according to claim 1, wherein a position where the capacitor is directly connected to the conductor connection portion is disposed in the vicinity of the load.

5. A noise eliminating wire harness comprising:
   a press clamping portion configured to receive a wire;
   a tab portion which is connected to the press clamping portion, and which extends in a direction perpendicular to the wire;
   a capacitor including a first terminal and a second terminal;
   a connection terminal which receives the first terminal of the capacitor, and which extends in a direction perpendicular to the wire and perpendicular to the tab portion; and
   a grounding terminal which is connected to ground, and which receives the second terminal of the capacitor;
   wherein the tab portion is electrically connected to the connection terminal.

6. The noise eliminating wire harness according to claim 1, wherein the conductor connection portion is formed by removing a sheath of the wire at an intermediate portion of the wire to expose a conductor of the wire.

7. The noise eliminating wire harness according to claim 1, wherein the capacitor is arranged outside of the wire.

* * * * *